W. R. BAKER.
HARVESTER.
No. 175,585. Patented April 4, 1876.
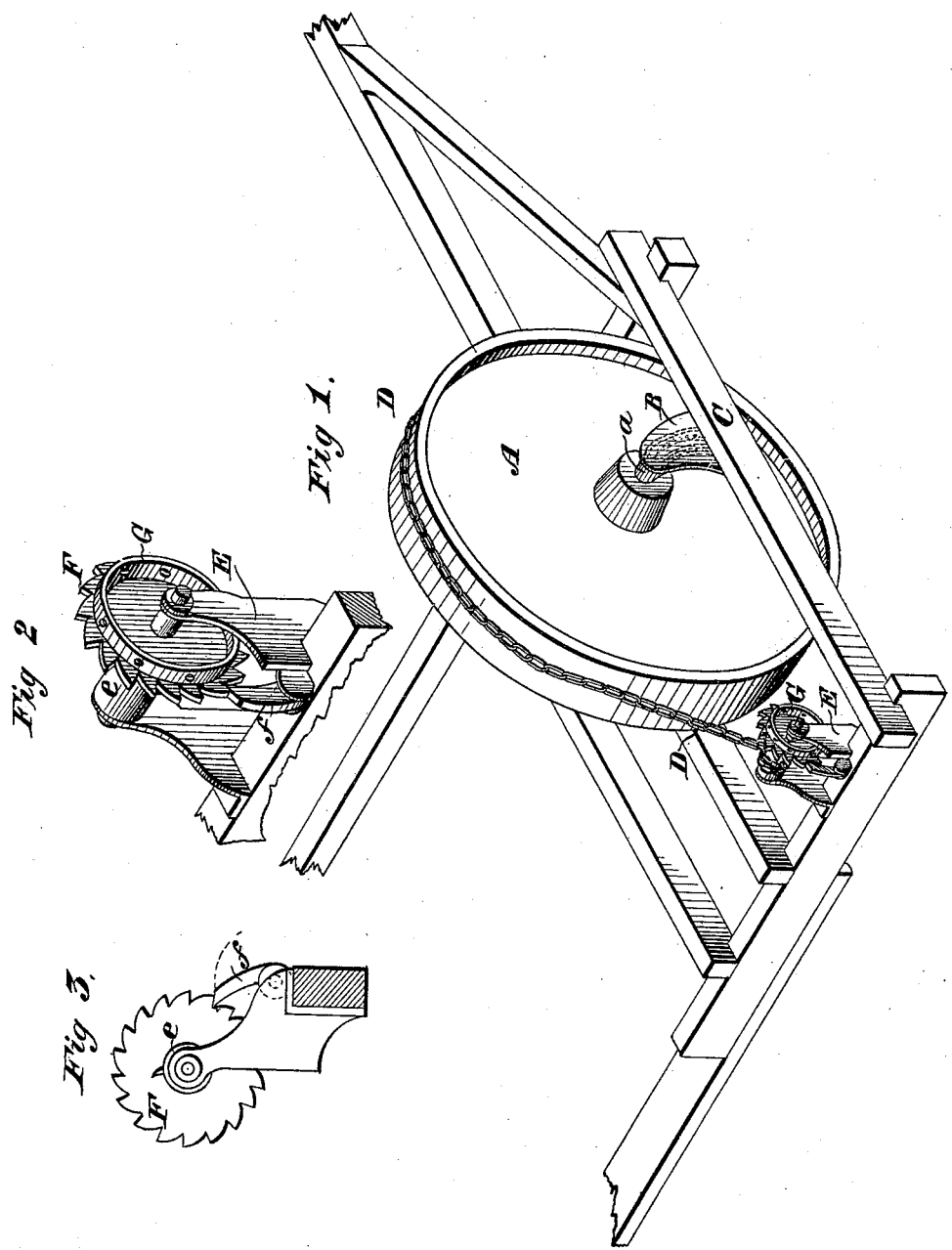
WITNESSES
Franck L. Durand
Wm A. Skinkle
INVENTOR
William R. Baker
By his Attorney
Wm D. Baldwin

UNITED STATES PATENT OFFICE.

WILLIAM R. BAKER, OF CHICAGO, ILLINOIS, ASSIGNOR TO C. H. & L. J. McCORMICK, OF SAME PLACE.

IMPROVEMENT IN HARVESTERS.

Specification forming part of Letters Patent No. 175,585, dated April 4, 1876; application filed February 28, 1876.

*To all whom it may concern:*

Be it known that I, WILLIAM R. BAKER, of Chicago, in the county of Cook and State of Illinois, have invented a new and useful Improvement in Harvesters, of which the following is a specification:

My invention relates to a novel method of raising and lowering the main frame of a harvester bodily upon its main shaft or axle; and my improvement, to this end, consists in the combination of a driving-wheel, a main frame adjustable thereon, a lifting-chain passing over the driving-wheel, and a windlass, around the barrel of which the chain is wound.

In the accompanying drawings my invention is represented as applied to a hand-binding harvester of the type built by McCormick & Bros., of Chicago, Illinois, having a single driving-wheel.

Figure 1 represents a view in perspective of so much of a harvester embracing my improvements as is necessary to illustrate the subject-matter herein claimed. Fig. 2 represents an enlarged perspective view of the windlass and its detent, and Fig. 3 a side elevation thereof.

A main driving-wheel, A, is shown as turning on an axle, *a*, adjustable vertically in the arc of a circle in curved flanged guides B, one at either end, but one only of which is shown in the drawing, the axle being held at any desired elevation by pins passing transversely through the guides and axle, or on either side thereof, in a well-known way. Other equivalent and well-known means of holding the axle in its desired position may be used, if preferred. These flanged guides are secured upon the main frame C, to the front cross bar of which the lifting-chain D is secured by a hook or staple. This chain passes over the driving-wheel, and is wound upon the barrel *e* of a windlass, E, mounted upon the rear cross-timber of the frame, provided with a ratchet-wheel, F, and pawl *f*, to prevent the unwinding of the chain, and with a perforated flange, G, in the holes of which a spike or lever may be inserted to wind up the chain.

In using this device the axle must be released from its fastenings in the flanged guides, so as to allow the frame to rise as the chain is wound up, and when the frame has been lifted to the desired elevation the axle is again secured in its guides in its adjusted position. The chain may then be slackened to prevent friction on the driving-wheel, or, by preference, is entirely removed.

As hand-binding harvesters cut at a considerable elevation above the ground the changes in elevation required are comparatively infrequent, being merely to adapt the machine to cutting in different fields, and this invention is peculiarly adapted to that class of machines.

I have shown the lifting-chain as fastened to the front cross-bar of the machine, and the windlass as mounted on the rear cross-bar thereof, being the plan which I prefer; but, obviously, the position of the windlass might be reversed.

It is equally obvious that the main frame could be lifted by passing the chain over a pulley on, or enlargement of, the driving-wheel hub, or that chains and pulleys could be duplicated, so as to have one chain pass each side of the driving-wheel; but I prefer the plan shown as cheaper, simpler, and equally efficient.

I claim as of my own invention—

The combination, substantially as hereinbefore set forth, of the main frame, the driving-wheel, the lifting-chain attached to the main frame, and passing over the driving-wheel, and the windlass, for the purpose specified.

In testimony whereof I have hereunto subscribed my name.

WM. R. BAKER.

Witnesses:
JOHN V. A. HASBROOK,
JAMES H. SHIELDS.